United States Patent
Zargar et al.

(10) Patent No.: US 10,769,391 B2
(45) Date of Patent: *Sep. 8, 2020

(54) FLEXIBLE LABEL WITH ACTIVATING CIRCUITRY

(71) Applicant: RFMicron, Inc., Austin, TX (US)

(72) Inventors: Tanmay Zargar, Austin, TX (US); Alan Wayne Hansford, Austin, TX (US); Shahriar Rokhsaz, Austin, TX (US)

(73) Assignee: RFMicron, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/564,454

(22) Filed: Sep. 9, 2019

(65) Prior Publication Data

US 2020/0005003 A1 Jan. 2, 2020

Related U.S. Application Data

(63) Continuation of application No. 16/011,452, filed on Jun. 18, 2018, now Pat. No. 10,410,026.

(60) Provisional application No. 62/607,709, filed on Dec. 19, 2017.

(51) Int. Cl.
| | |
|---|---|
| *G06K 7/08* | (2006.01) |
| *G06K 7/10* | (2006.01) |
| *G06K 19/07* | (2006.01) |
| *G06K 19/077* | (2006.01) |
| *G06K 19/073* | (2006.01) |

(52) U.S. Cl.
CPC ..... *G06K 7/10366* (2013.01); *G06K 19/0717* (2013.01); *G06K 19/0723* (2013.01); *G06K 19/07345* (2013.01); *G06K 19/07726* (2013.01)

(58) Field of Classification Search
CPC ............ G08B 13/2417; G08B 13/1427; G08B 21/0219; G08B 21/0255; G08B 21/0275; G08B 25/016; G08B 13/2457; G08B 25/008; G08B 7/066; G06K 19/0705; G06K 19/071; G06K 19/0711; G06K 19/07762; G06K 19/0707; G06K 19/0712; G06K 19/0717; G06K 19/07703; G06K 19/07749; G06K 2017/0045; G06K 7/0095; G06K 7/10237; G06K 7/10366
See application file for complete search history.

(56) References Cited

U.S. PATENT DOCUMENTS 6,294,997 B1 * 9/2001 Paratore ............. G06K 19/0717
235/385
8,830,072 B2 9/2014 Batra
9,436,853 B1 * 9/2016 Meyers ................ G06K 7/0008
(Continued)

*Primary Examiner* — Thien M Le
(74) *Attorney, Agent, or Firm* — Garlick & Markison; Timothy W. Markison; Timothy D. Taylor

(57) ABSTRACT

A label sensor that can be affixed to an item includes a first section and a second section. The first section includes a memory, an environmental sensor, a radio frequency (RF) front end that includes a tuning circuit, and a processing module. The processing module is operably coupled to the memory, the environmental sensor, and the RF front end. The second section includes an activation circuit that is operable, upon receiving an input, to activate one or more of the memory, the environmental sensor, the RF front end and the processing module. The activation causes the label sensor to be put in a first operational mode of a plurality of operational modes.

14 Claims, 9 Drawing Sheets

(56) References Cited

U.S. PATENT DOCUMENTS

| | | | |
|---|---|---|---|
| 10,410,026 B2 * | 9/2019 | Zargar | G06K 19/0717 |
| 2003/0146836 A1 * | 8/2003 | Wood | G06K 19/0717 340/540 |
| 2006/0261946 A1 * | 11/2006 | Himberger | G06K 19/0717 340/572.1 |
| 2007/0236338 A1 * | 10/2007 | Maruyama | B65G 1/137 340/10.41 |
| 2009/0278685 A1 * | 11/2009 | Potyrailo | G01N 33/0073 340/572.1 |
| 2010/0033323 A1 * | 2/2010 | Tsai | G06K 19/0717 340/539.31 |
| 2012/0116820 A1 | 5/2012 | English | |
| 2012/0242481 A1 | 9/2012 | Germandt | |
| 2013/0284905 A1 * | 10/2013 | Forster | G01N 21/255 250/214.1 |
| 2014/0232519 A1 | 8/2014 | Allen | |
| 2014/0240088 A1 | 8/2014 | Robinette | |
| 2018/0039799 A1 | 2/2018 | Steinbrunner | |
| 2018/0216940 A1 | 8/2018 | Pattar | |

* cited by examiner wireless communication system 10

RF signal 120

FLEXIBLE LABEL WITH ACTIVATING CIRCUITRY

CROSS REFERENCE TO RELATED PATENTS

The present U.S. Utility patent application claims priority pursuant to 35 U.S.C. § 120 to U.S. application Ser. No. 16/011,452, entitled "FLEXIBLE LABEL WITH ACTIVATING CIRCUITRY", filed Jun. 18, 2018, issuing as U.S. Pat. No. 10,410,026 on Sep. 10, 2019, which claims priority pursuant to 35 U.S.C. § 119(e) to U.S. Provisional Application No. 62/607,709, entitled "FLEXIBLE LABEL WITH ACTIVATING CIRCUITRY", filed Dec. 19, 2017, all of which are hereby incorporated herein by reference in their entirety and made part of the present U.S. Utility patent application for all purposes.

BACKGROUND OF THE INVENTION

Technical Field of the Invention

This application relates generally to wireless data communication systems and more particularly to processing data representative of environmental sensed conditions.

Description of Related Art

Wireless communication systems are known to include wireless transceivers that communication directly and/or over a wireless communication infrastructure. In direct wireless communications, a first wireless transceiver includes baseband processing circuitry and a transmitter to convert data into a wireless signal (e.g., radio frequency (RF), infrared (IR), ultrasound, near field communication (NFC), etc.). Via the transmitter, the first wireless transceiver transmits the wireless signal. When a second wireless transceiver is in range (e.g., is close enough to the first wireless transceiver to receive the wireless signal at a sufficient power level), it receives the wireless signal via a receiver and converts the signal into meaningful information (e.g., voice, data, video, audio, text, etc.) via baseband processing circuitry. The second wireless transceiver may wirelessly communicate back to the first wireless transceiver in a similar manner.

Examples of direct wireless communication (or point-to-point communication) include walkie-talkies, Bluetooth, ZigBee, Radio Frequency Identification (RFID), etc. As a more specific example, when the direct wireless communication is in accordance with RFID, the first wireless transceiver may be an RFID reader and the second wireless transceiver may be an RFID tag.

For wireless communication via a wireless communication infrastructure, a first wireless communication device transmits a wireless signal to a base station or access point, which conveys the signal to a wide area network (WAN) and/or to a local area network (LAN). The signal traverses the WAN and/or LAN to a second base station or access point that is connected to a second wireless communication device. The second base station or access point sends the signal to the second wireless communication device. Examples of wireless communication via an infrastructure include cellular telephone, IEEE 802.11, public safety systems, etc.

In many situations, direct wireless communication is used to gather information that is then communicated to a computer. For example, an RFID reader gathers information from RFID tags via direct wireless communication. At some later point in time (or substantially concurrently), the RFID reader downloads the gathered information to a computer via a direct wireless communication or via a wireless communication infrastructure.

In many RFID systems, the RFID tag is a passive component. As such, the RFID tag has to generate one or more supply voltages from the RF signals transmitted by the RFID reader. Accordingly, a passive RFID tag includes a power supply circuit that converts the RF signal (e.g., a continuous wave AC signal) into a DC power supply voltage. The power supply circuit includes one or more diodes and one or more capacitors. The diode(s) function to rectify the AC signal and the capacitor(s) filter the rectified signal to produce the DC power supply voltage, which powers the circuitry of the RFID tag.

Once powered, the RFID tag receives a command from the RFID reader to perform a specific function. For example, if the RFID tag is attached to a particular item, the RFID tag stores a serial number, or some other identifier, for the item. In response to the command, the RFID tag retrieves the stored serial number and, using back-scattering, the RFID tag transmits the retrieved serial number to the RFID reader.

BRIEF DESCRIPTION OF THE SEVERAL VIEWS OF THE DRAWING(S)

DETAILED DESCRIPTION OF THE INVENTION

Figure 1:
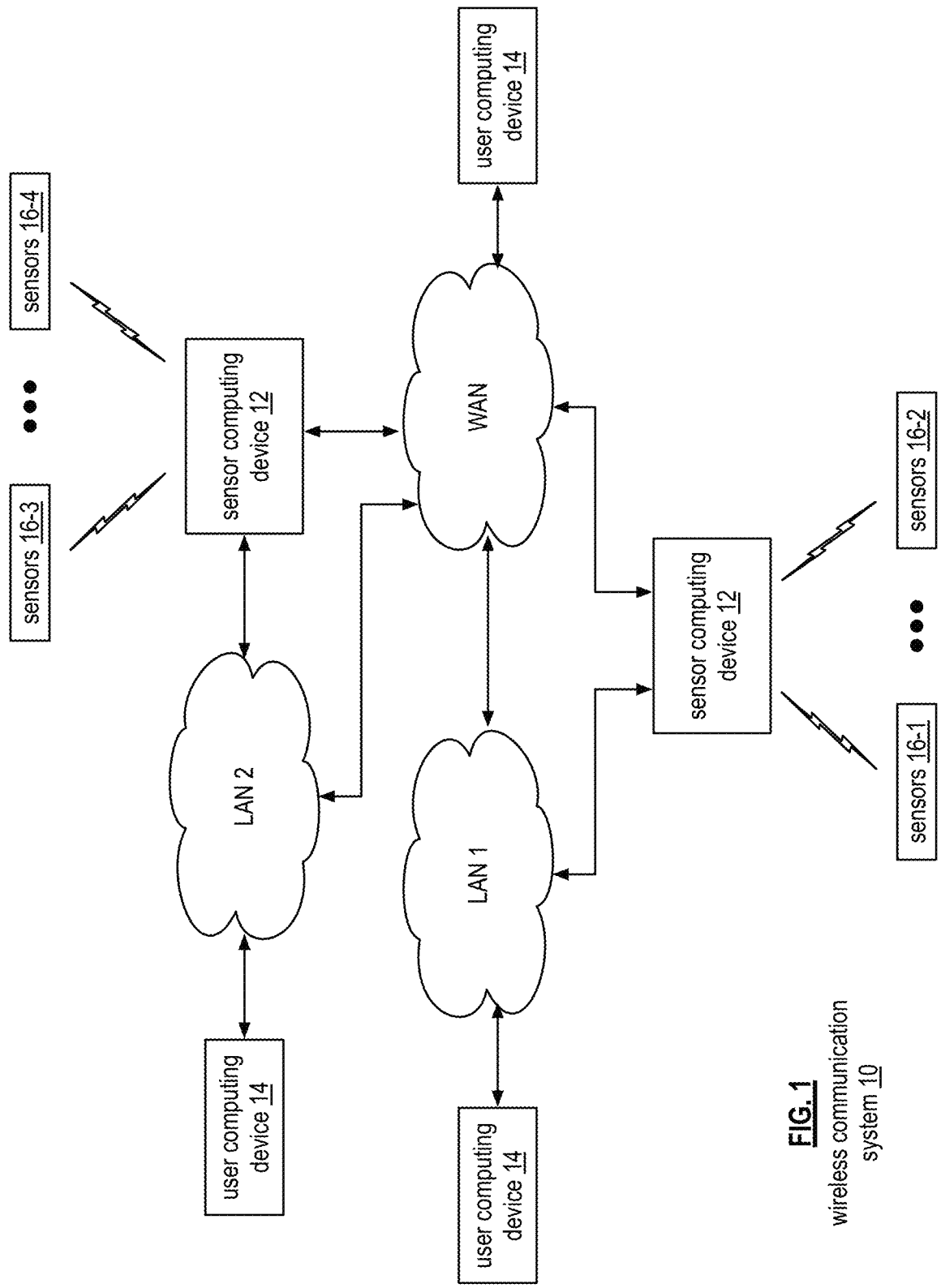
FIG. 1 is a schematic block diagram of an embodiment of a communication system in accordance with the present invention.

FIG. 1 is a schematic block diagram of an embodiment of a communication system 10 that includes a plurality of sensor computing device 12, a plurality of user computing devices 14, a plurality of passive wireless sensors 16-1 through 16-4, one or more wide area networks (WAN), and one or more local area networks (LAN). The passive wireless sensors 16-1 through 16-4, when activated, sense one or more of a variety of conditions. For example, one passive wireless sensor senses for the presence, absence, and/or amount of moisture in a given location (e.g., in a room, in a manufactured item or component thereof (e.g., a vehicle), in a bed, in a diaper, etc.). As another example, a passive wireless sensor senses pressure on and/or in a particular item (e.g., on a seat, on a bed, in a tire, etc.)

As yet another example, a passive wireless sensor senses temperature within a space and/or of an item (e.g., surface temperature of the item, in a confined space such as a room or a box, etc.). As a further example, a passive wireless sensor senses humidity within a space (e.g., a room, a closet, a box, a container, etc.). As a still further example, a passive wireless sensor senses the presence and/or percentages of a gas within a space (e.g., carbon monoxide in a car, carbon monoxide in a room, gas within a food container, etc.). As an even further example, a passive wireless sensor senses the presence and/or percentages of a light within a space. As yet a further example, a passive wireless sensor senses the presence, percentages, and/or properties of one or more liquids in a solution. In one more example, a passive wireless sensor senses location proximity of one item to another and/or the proximity of the passive wireless sensor to an item (e.g., proximity to a metal object, etc.).

In general, the sensor computing devices 12 function to collect the sensed data from the passive wireless sensors and process the sensed data. For example, a passive wireless sensor generates a coded value representative of a sensed condition (e.g., amount of moisture). A sensor computing device 12 receives the coded value and processes it to determine an accurate measure of the sensed condition (e.g., a value corresponding to the amount of moisture such as 0% saturated, 50% saturated, 100% saturated, etc.).

The user computing devices 14 communication with one or more of the sensor computing devices 12 to gather the accurate measures of sensed conditions for further processing. For example, assume that the wireless communication system is used by a manufacturing company that has multiple locations for assembly of its products. In particular, LAN 1 is at a first location where a first set of components of products are processed and the LAN 2 is at a second location where second components of the products and final assembly of the products occur. Further assume that the corporate headquarters of the company is at a third location, where it communicates with the first and second locations via the WAN and LANs.

In this example, the sensor computing device 12 coupled to LAN 1 collects and processes data regarding the first set of components as sensed by passive wireless sensors 16-1 and 16-2. The sensor computing device 12 is able to communicate this data to the user computing device 14 coupled to the LAN 1 and/or to the computing device 14 at corporate headquarters via the WAN. Similarly, the sensor computing device 12 coupled to LAN 2 collects and processes data regarding the second set of components and final assembly as sensed by passive wireless sensors 16-3 and 16-4. This sensor computing device 12 is able to communicate this data to the user computing device 14 coupled to the LAN 2 and/or to the computing device 14 at corporate headquarters via the WAN. In such a system, real time monitor is available locally (e.g., via the LAN) and is further available non-locally (e.g., via the WAN). Note that any of the user computing devices 14 may receive data from the any of the sensor computing devices 12 via a combination of LANs and the WAN.

Figure 2:
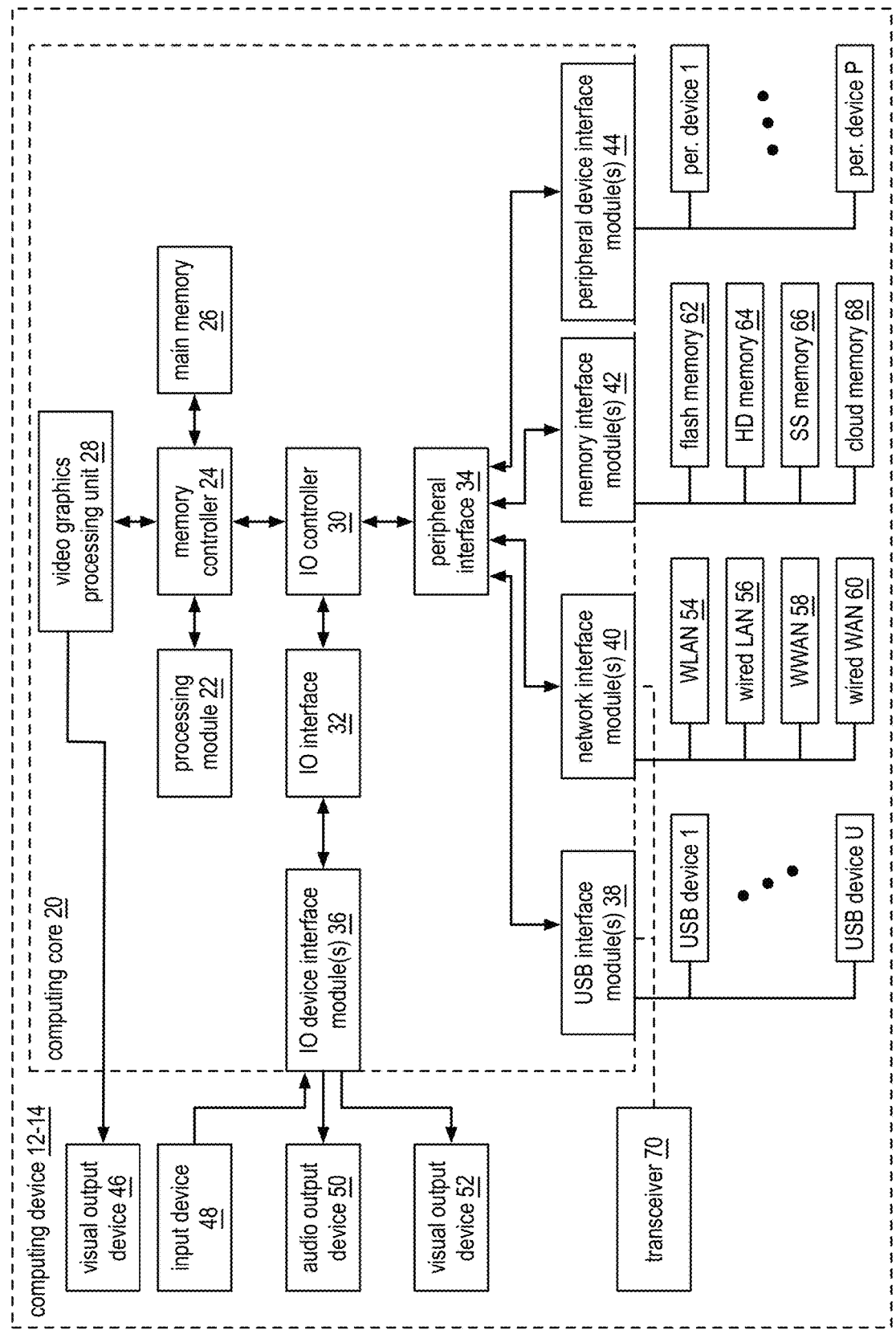
FIG. 2 is a schematic block diagram of an embodiment of a computing device in accordance with the present invention.

FIG. 2 is a schematic block diagram of an embodiment of a computing device 12 and/or 14 that includes a computing core 20, one or more input devices 48 (e.g., keypad, keyboard, touchscreen, voice to text, etc.), one or more audio output devices 50 (e.g., speaker(s), headphone jack, etc.), one or more visual output devices 46 (e.g., video graphics display, touchscreen, etc.), one or more universal serial bus (USB) devices, one or more networking devices (e.g., a wireless local area network (WLAN) device 54, a wired LAN device 56, a wireless wide area network (WWAN) device 58 (e.g., a cellular telephone transceiver, a wireless data network transceiver, etc.), and/or a wired WAN device 60), one or more memory devices (e.g., a flash memory device 62, one or more hard drives 64, one or more solid state (SS) memory devices 66, and/or cloud memory 96), one or more peripheral devices, and/or a transceiver 70.

The computing core 20 includes a video graphics processing unit 28, one or more processing modules 22, a memory controller 24, main memory 26 (e.g., RAM), one or more input/output (I/O) device interface module 36, an input/output (I/O) interface 32, an input/output (I/O) controller 30, a peripheral interface 34, one or more USB interface modules 38, one or more network interface modules 40, one or more memory interface modules 42, and/or one or more peripheral device interface modules 44. Each of the interface modules 36-44 includes a combination of hardware (e.g., connectors, wiring, etc.) and operational instructions stored on memory (e.g., driver software) that is executed by the processing module 22 and/or a processing circuit within the respective interface module. Each of the interface modules couples to one or more components of the computing device 12-14. For example, one of the 10 device interface modules 36 couples to an audio output device 50. As another example, one of the memory interface modules 42 couples to flash memory 62 and another one of the memory interface modules 42 couples to cloud memory 68 (e.g., an on-line storage system and/or on-line backup system).

The transceiver 70 is coupled to the computing core 20 via a USB interface module 38, a network interface module 40, a peripheral device interface module 44, or a dedicated interface module (not shown). Regardless of how the transceiver 70 is coupled to the computing core, it functions to communication with the passive wireless sensors.

Figure 3:
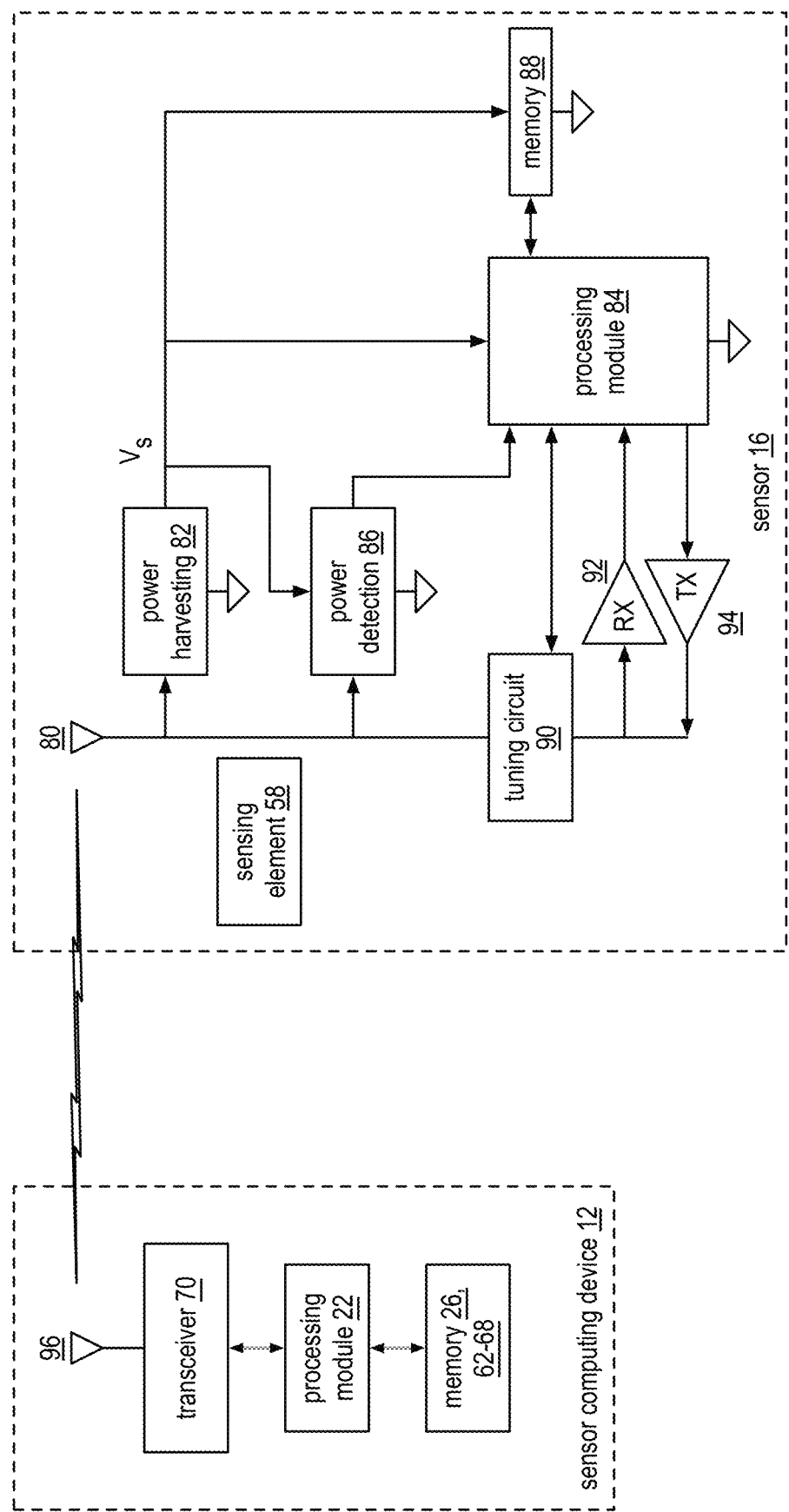
FIG. 3 is a schematic block diagram of an example of a sensor computing device communicating with a passive wireless sensor in accordance with the present invention.

FIG. 3 is a schematic block diagram of an example of a sensor computing device 12 communicating with a passive wireless sensor 16 (e.g., any one of 16-1 through 16-4). The sensor computing device 12 is illustrated in a simplified manner; as such, it shown to include the transceiver 70, an antenna 96, the processing module 22, and the memory (e.g., one or more 26 and 62-68). The passive wireless sensor 16 includes an antenna 80, one or more sensing elements 58, a power harvesting circuit 82, a power detection circuit 86, a processing module 84, memory 88, a tuning circuit 90, a receiver section 92, and a transmitter section 94.

In an example, the sensing element 58 of the passive wireless sensor 16 senses an environmental condition of an object. The environment condition includes, but is not limited to, one or more of moisture, temperature, pressure, humidity, altitude, sonic wave (e.g., sound), human contact, surface conditions, tracking, location, etc. The object includes one or more of, but is not limited to, a box, a personal item (e.g., clothes, diapers, etc.), a pet, an automobile component, an article of manufacture, an item in transit, etc. The sensing element 58 senses the environmental condition (e.g., moisture) and, as a result of the sensed condition, the sensing element 58 affects an operational parameter (e.g., input impedance, quality factor, frequency, etc.) of an RF front end of the passive wireless sensor. Note that the RF front end includes one or more of the antenna 80, the tuning circuit 90, the transmitter section 94, the receiver section 92.

As a specific example, the sensing element 58, as a result of the sensed environmental condition, affects the input impedance of the antenna structure 80 and/or of the tuning circuit 90 (e.g., a tank circuit that includes one or more capacitors and one or inductors having a resonant frequency corresponding to the carrier frequency of the RF signal). In response to the impedance change, the processing module 84 adjusts the resonant frequency of the tuning circuit 90 to compensate for the change in input impedance caused by the sensed environmental condition. The amount of adjustment is reflective of the level of the environmental condition (e.g., a little change corresponds to a little moisture; a large change corresponds to a large amount of moisture). The processing module 84 generates a coded value to represent the amount of adjustment and conveys the coded value to the sensor computing device 12 via the transmitter section 94 and the antenna 80 using back-scattering.

In addition to processing the sensed environmental condition, the processing module 84 processes a power level adjustment. For example, the power detection circuit 86 detects a power level of the received RF signal. In one embodiment, the processing module interprets the power level and communicates with the sensor computing device 12 to adjust the power level of the RF signal transmitted by the computing device 12 to a desired level (e.g., optimal for accuracy in detecting the environmental condition). In another embodiment, the processing module 84 includes the received power level data with the environmental sensed data it sends to the sensor computing device 12 so that the computing device can factor the power level into the determination of the environmental condition. One or more of these concepts will be described in greater detail with reference to one or more of FIGS. 4-9.

Figure 4:
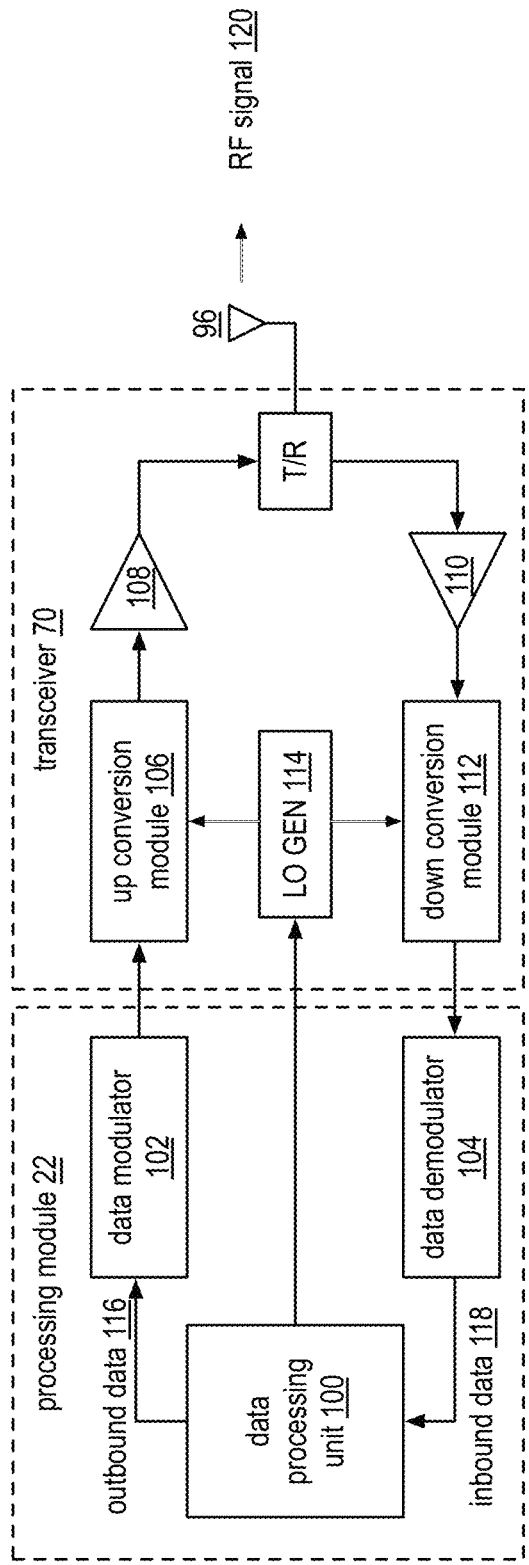
FIG. 4 is a schematic block diagram of an embodiment of a portion of a sensor computing device in accordance with the present invention.

FIG. 4 is a schematic block diagram of an embodiment of a portion of a sensor computing device 12 that includes the processing module 22 and the transceiver 70. The processing module 22 includes a data processing unit 100, a data modulator 102, and a data demodulator 104. The transceiver 70 includes an up conversion module 106, a transmit amplifier 108 (e.g., a power amplifier), a transmit/receive unit (T/R), a receiver amplifier 110 (e.g., a low noise amplifier), a down conversion module 112, and a local oscillation generator (LO GEN) 114.

Figure 5:
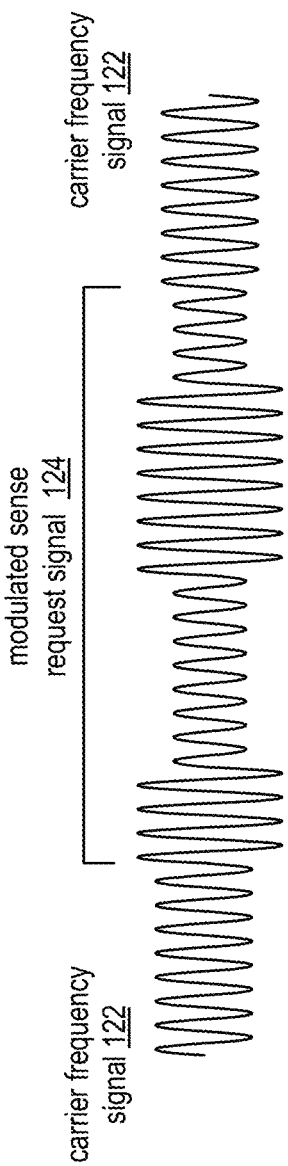
FIG. 5 is a diagram of an example of an RF signal in accordance with the present invention.

In an example of operation, the local oscillation generator (LOGEN) 114 generates, based on an input from the data processing module 22 (e.g., from the data processing unit) to generate a continuous wave signal at a particular carrier frequency (e.g., in the range of 902-928 MHz). To establish communication with the passive wireless sensor 16, the transceiver 70 first transmits, as an RF signal 120 the continuous wave signal at the particular carrier frequency 122 as shown in FIG. 5. During the startup, or power up, phase, the processing module 22 is not generating outbound data 116.

With reference to both FIGS. 4 and 5, when the passive wireless sensor 16 is powered up (as will be described below with reference to one or more of FIGS. 6-12), the data processing unit 100 generates outbound data 116 (e.g., a digital representation of a sense command). The data modulator 102 converts the outbound data 116 into modulated data and provides the modulated data to the up conversion module 106.

The up conversion module 106 mixes the continuous wave signal at a particular carrier frequency with the modulation data to produce the modulated sense request signal 124 of the RF signal 120. For example, the computing device 12 uses amplitude shifting keying (ASK) to generate the modulated sense request signal 124. As such, the modulated data produced by the data modulator 102 adjusts the amplitude of the continuous wave signal. In particular, for a digital value of 1, the modulated data is a first amplitude gain to change the amplitude of the continuous wave signal to a first level or a first pattern (e.g., per RFID standard ISO/IEC 18000-6) and, for a digital value of 0, the modulated data is a second amplitude gain to change the amplitude of the continuous wave signal to a second level or to a second a pattern (e.g., per the RFID standard). After transmitting the modulated sense request signal 124, the transmitter resumes sending the continuous wave (i.e., carrier frequency) signal 122.

The passive wireless sensor 16 receives the RF signal 120, down converts and demodulates it to recover the sense request signal (i.e., the outbound data 116). In response to the request or automatically, the passive wireless sensor 16 senses an environmental condition as discussed with reference to FIG. 3. The passive wireless sensor 16 generates a coded value representing a change in an operating parameter of its front end. Utilizing backscattering, the passive wireless sensor modulates the continuous wave signal with the coded value to produce an RF response signal.

The computing device receives the RF response signal via the antenna 96 and down converts it via the down conversion module 112. The data demodulator 104 demodulates the down converted signal to recapture the coded value as inbound data 118. As an example, the down conversion module 112 mixes the continuous wave signal produced by the LOGEN 114 with the RF response signal to produce a baseband, or near baseband, inbound signal. The data demodulator 104 demodulates the baseband, or near baseband, inbound signal to produce the inbound data 118. As a specific example of ASK demodulation, the down conversion module and the data demodulator perform inverse ASK functions of the data modulator 102 and the up conversion module 106.

Figure 6:
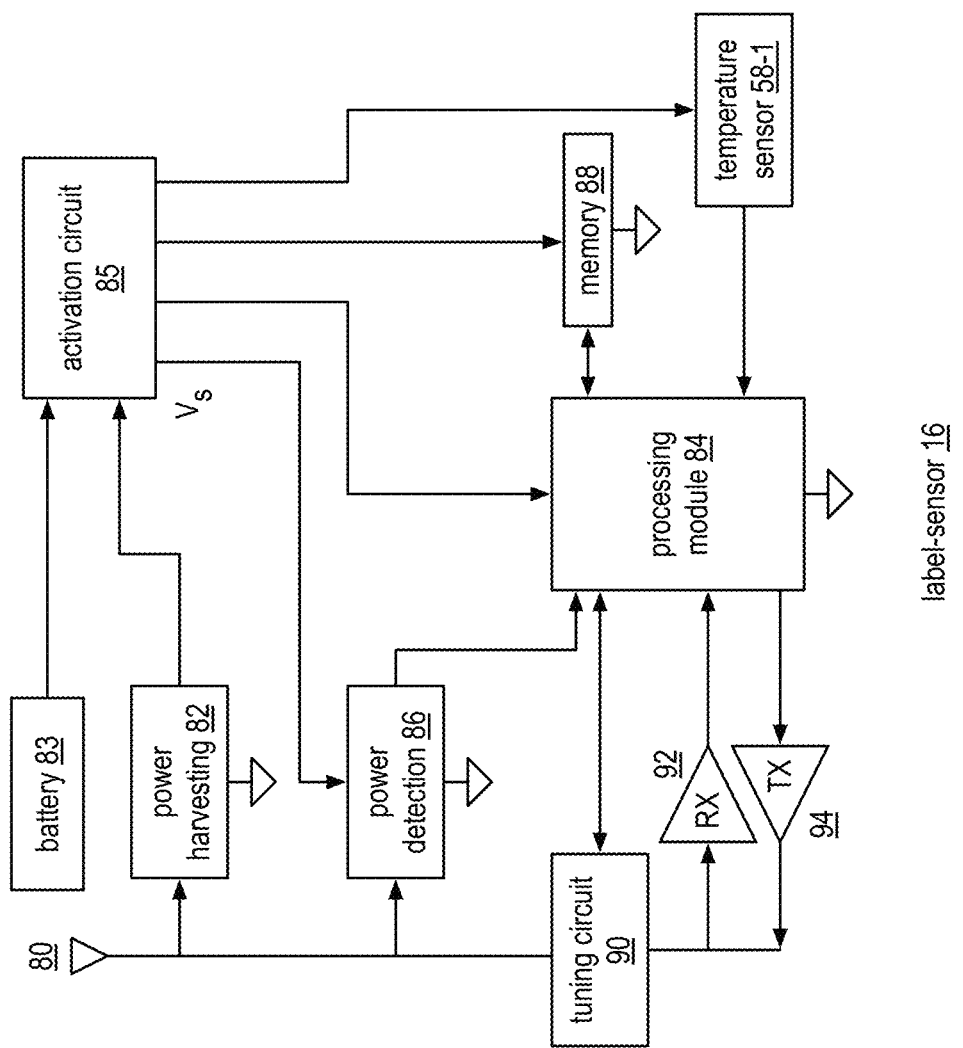
FIG. 6 is a schematic block diagram of an embodiment of a label-sensor computing device in accordance with the present invention.

FIG. 6 is a schematic block diagram of an embodiment of a label-sensor computing device 16 that includes an antenna 80, a temperature sensing elements 58-1 (i.e., a temperature sensor), a power harvesting circuit 82, a power detection circuit 86, a processing module 84, memory 88, a tuning circuit 90, a receiver section 92, a transmitter section 94, a battery 83 and an activation circuit 85. The label-sensor 16 may be used for a variety of applications to monitor temperature of an object for a specific duration of time, during transport of the object, and/or storage of the object.

For example, in certain medical applications, an empty vial is shipped to the patient's residence to obtain a sample of tissue, blood, saliva, etc. The label sensor is applied to the vial that is enabled to periodically measure and log the temperature of the sample once it has been sealed in the vial. As another example, the label-sensor 16 is applied to a food item that is being transported from one location (e.g., manufacturer's warehouse) to another location (e.g., a grocery store). During transit, the label-sensor measures and records the temperature of the food item during transit.

In an example of operation, the label-sensor 16 is placed on an object (e.g., a container, a vial, a package, etc.) to monitor temperature of the object and/or contents thereof. When the temperature is to be captured, the activation circuit 85 receives an input (e.g., a finger touch of a switch or multiple switches, turning of a lid, etc.), and enables the label sensor 16 to periodically monitor and record temperature. As a specific example, a blood sample is placed in a vial and the vial is then sealed. The label-sensor 16, which is fabricated on a flexible circuit board, is adhered to the vial.

Once the vial is sealed, the activation circuit 85 is triggered and the circuitry of the label sensor 16 is activated. In an embodiment, the activation circuit 85 includes a raised 'bubble' switch that includes a raised area so that it can be detected and activated via human touch. The switch is depressed with sufficient force, it is activated and provides power to the circuitry of the sensor 16. With power applied, the temperature sensor 58-1 measures surface temperature of the vial, which is reflective of the temperature of the blood sample. The processing module periodically stores the temperature.

When the vial reaches its final destination, or at intervening destinations, a sensor computing device 12 "reads" the stored temperature data from the sensor 16. The reading includes the computing device 12 sending a RF signal to the sensor that includes a request for the stored temperature data. The sensor processes the RF signal as described above and generates an outbound RF signals that includes the stored temperature data. The computing device 12 and/or a user computing device 14 interprets the stored temperature data to verify that the sample was not compromised due to a temperature fluctuation.

In another embodiment, the activation circuit 85 includes two or more "bubble" switches. For instance, the finger spot(s), or more generally 'human interaction' spot(s), can be used to identify/isolate one of many electronic circuits of the sensor 16 to trigger different operational modes in these circuits depending on which spots are activated, in what order, etc.

With two or more switches, the activation circuit 85 provides 2N modes for the sensor, where N is the number of switches and the "2" corresponds to the number of states of a switch (e.g., active and not active). The table below illustrates this for a 2-spot example which generates 4 (22) modes. Note that a switch may have more than two states.

| Finger spot 1 | Finger spot 2 | Operational mode |
| --- | --- | --- |
| Not active | Not active | No action |
| Not active | Active | Turn on the circuit |
| Active | Not active | Turn on some other feature |
| Active | Active | Turn off the circuit |

Figure 7:
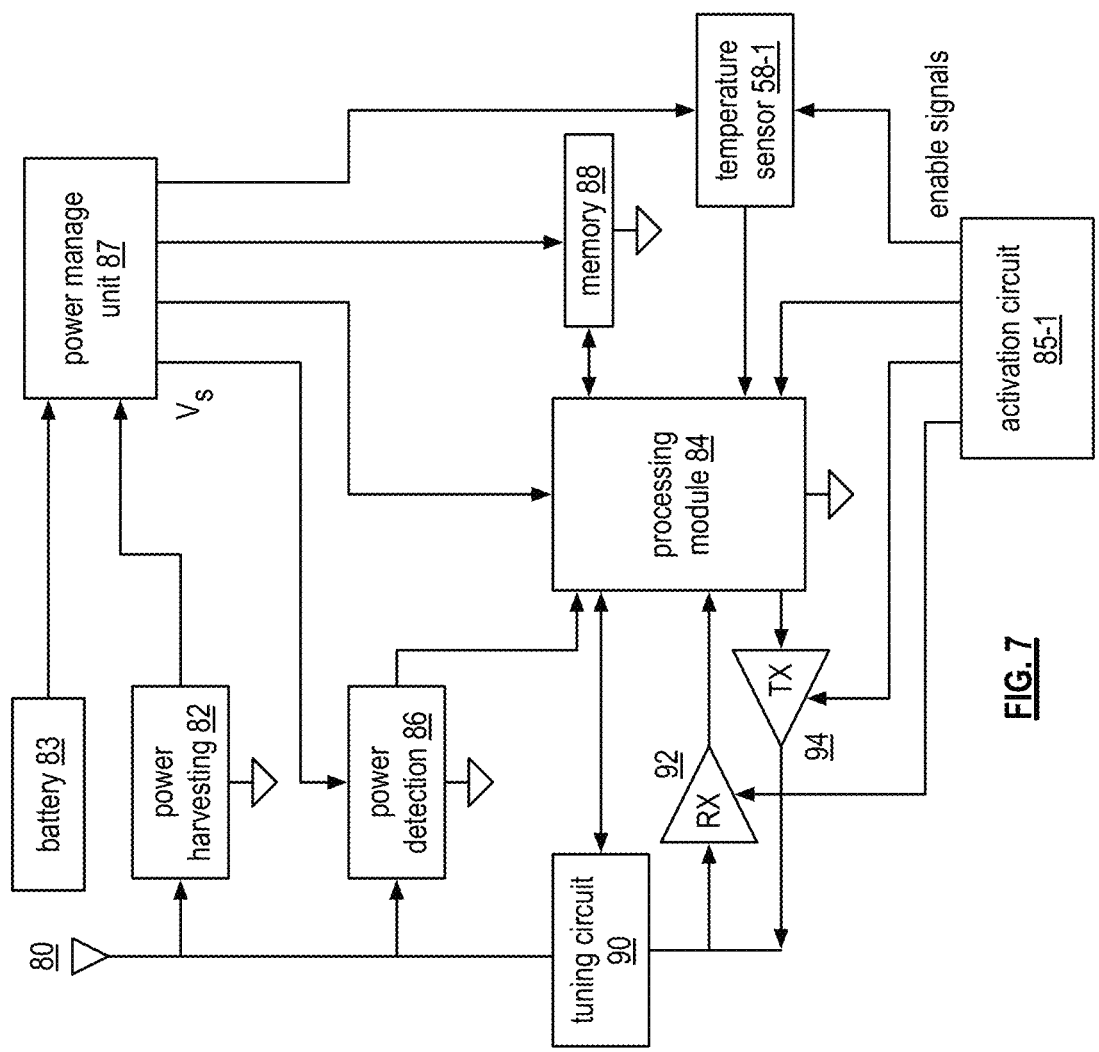
FIG. 7 is a schematic block diagram of another embodiment of a label-sensor computing device in accordance with the present invention.

FIG. 7 is a schematic block diagram of another embodiment of a label-sensor computing device that is similar to the sensor of FIG. 6, expect that the activation circuit 85 has been replaced by activation circuit 85-1 and a power management unit 87. The power management unit 87 provides a supply voltage Vs to the various components of the sensor 16. The activation circuit 85-1, which may be implemented in a similar manner as activation circuit 85, provides enabling signals to one or more of the circuits of the sensor 16. In this manner, each of the circuits may be placed in various active, sleep, and inactive modes based on the level of activation of the activation circuit 85-1 and the power settings of the power management unit 87.

Figure 8:
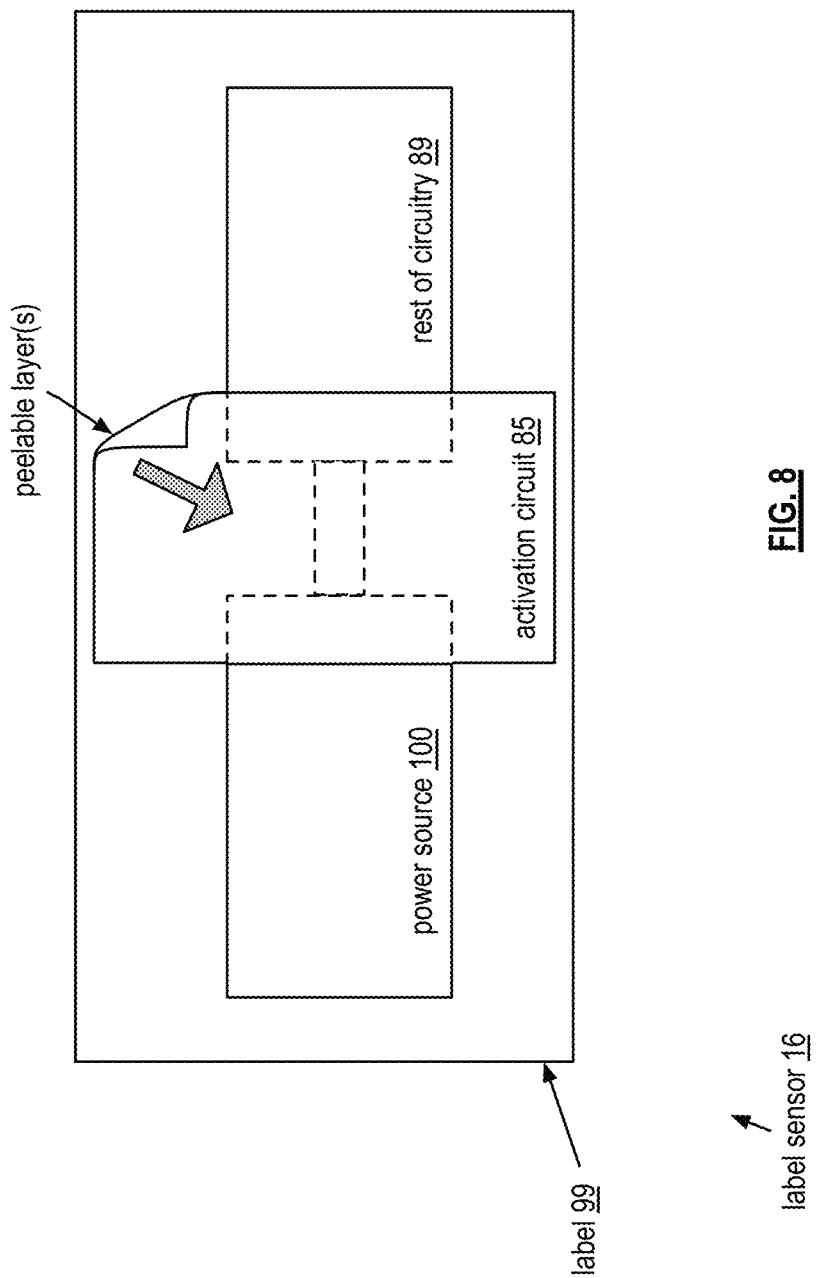
FIG. 8 is a schematic block diagram of another embodiment of a label-sensor computing device in accordance with the present invention.

FIG. 8 is a schematic block diagram of another embodiment of a label-sensor computing device 16 that includes a label 99, a power source 100, an activation circuit 85, and a rest of circuitry 89 portion of the label sensor. In one instance, the label is a flexible printed circuit board (PCB). The power source may be one or more of the battery 83, the power harvesting 82, the power detection 86 and the power management unit 87 of FIG. 7.

In an embodiment, the activation circuit 85 includes one or more peelable layers. When a layer is still on the label-sensor 16, it functions disable one or more circuits of the label sensor 16. When the layer is removed, it enables one or more circuits of the label sensor 16. For example, the layer includes an insulating material that prohibits an electrical connection between two electrical pads. When the layer is removed, an electrical connection is made between the two electrical pads.

In another instance, the activation circuit 85 includes multiple layers to trigger different operations in the electronic circuitry of the sensor 16. As a specific example, the sensor needs to be initially activated for a software download or update, initializing of coefficients for data processing, and/or a configuration of the circuitry of the sensor. The initial activation may be done by the manufacturer and/or by a bulk user.

As an example, a first peelable layer may be used to initialize the sensor for a particular user and/or for a particular use. For example, a hospital programs a sensor for use with a blood sample vial and for a particular patient. A second peelable layer is then used to activate the temperature measuring and recording once the sample has been collected.

Figure 9:
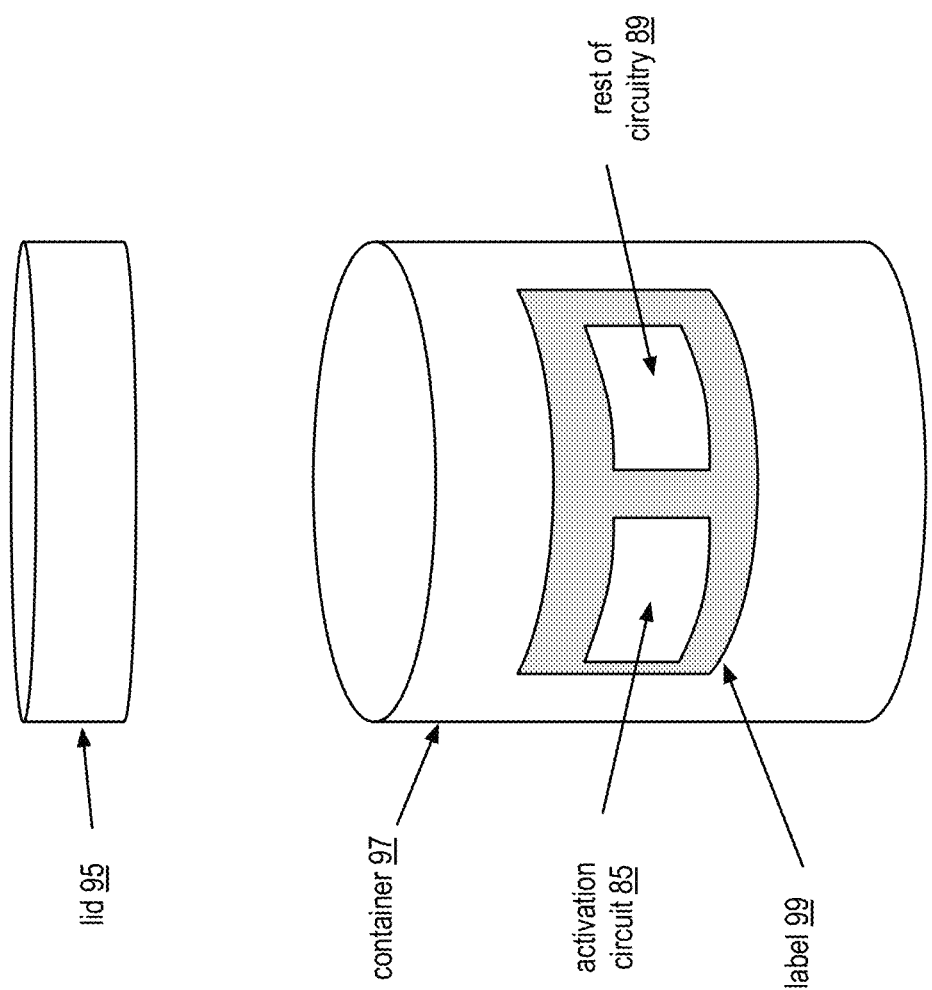
FIG. 9 is a schematic block diagram of another embodiment of a label-sensor computing device in accordance with the present invention.

FIG. 9 is a schematic block diagram of another embodiment of a label-sensor computing device 16 that includes the activation circuit 85, a label substrate 99, and the rest of the circuitry 89 of the sensor of one or more of the previous figures. The label sensor 16 is adhered to a container 97 (e.g., a vial), which has a corresponding lid 95. When the container 97 is housing a desired substance (e.g., blood sample) and the lid 95 is attached, the activation circuit 85 is activated to begin temperature measurements and recordings of the container and the contained sub stance.

Figure 10:
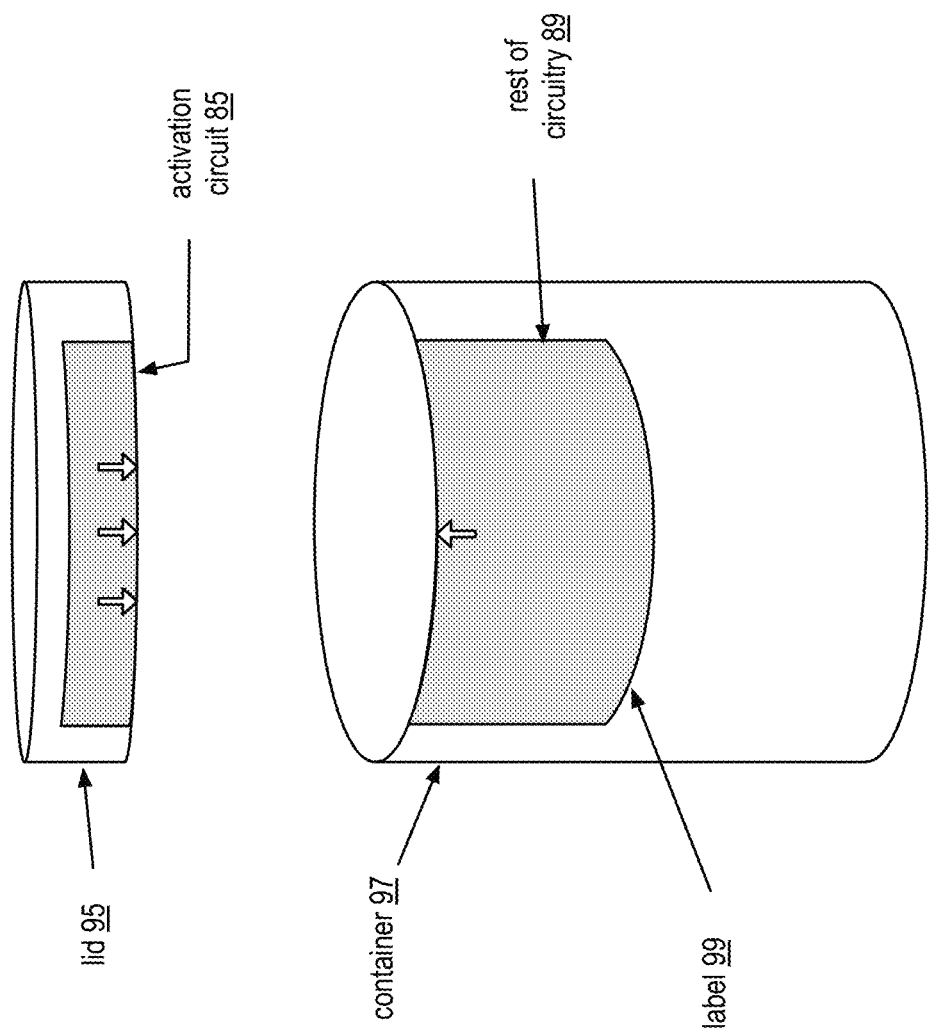
FIG. 10 is a schematic block diagram of another embodiment of a label-sensor computing device in accordance with the present invention.

FIG. 10 is a schematic block diagram of another embodiment of a label-sensor computing device 16 that include the activation circuit 85 coupled to the lid 95 and the rest of the circuitry 89 of the sensor 16 coupled to the container 97. In this example, when the container 97 is housing a substance, the lid 95 is attached to the container 97. Based on the alignment of the arrows of the activation circuit 85 with the arrow, or arrows, of the rest of the circuitry 89, one or more functions of the sensor is activated.

For example, when a first arrow of the activation circuit 85 is aligned with the arrow of the rest of the circuitry 89, the sensor is programmed by the manufacturer. When a second arrow of the activation circuit 85 is aligned with the arrow of the rest of the circuitry 89, the sensor is allocated to a particular object for a particular function (e.g., blood sample for a particular patient). When a third arrow of the activation circuit 85 is aligned with the arrow of the rest of the circuitry 89, the sensor is activated for measuring and recording temperature. Note that the activation circuit 85 may include one or more arrows for aligning with the arrow of the rest of the circuitry 89 to enable one or more functions of the sensor. Further note that the lid 95 may have twist locks, such that, for each arrow, the lid locks into place with the container 97.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A label sensor comprising:
    a first section of the label sensor, wherein the label sensor is operable to be affixed to an item, and wherein the first section includes:
        memory;
        an environmental sensor;
        a radio frequency (RF) front end, wherein the RF front end includes a tuning circuit; and
        a processing module operably coupled to the memory, the environmental sensor, and the RF front end; and
    a second section of the label sensor that includes an activation circuit, wherein the activation circuit is operable, upon receiving an input, to activate one or more of the memory, the environmental sensor, the RF front end and the processing module, and wherein the activation causes the label sensor to be put in a first operational mode of a plurality of operational modes.

2. The label sensor of claim 1, wherein the plurality of operational modes comprises two or more of:
    initially activating a computing device;
    initializing of coefficients for data processing;
    configuration of the label sensor by a user;
    operation of the memory;
    operation of the environmental sensor;
    operation of the RF front end; and
    operation the processing module.

3. The label sensor of claim 1, wherein the label sensor is fabricated on a flexible circuit board.

4. The label sensor of claim 1, wherein the input comprises one or more of:
    a radio frequency (RF) signal;
    an electrical input; and
    a mechanical input.

5. The label sensor of claim 1, wherein the RF front end further includes one or more of:
    a receiver;
    a transmitter; and
    an antenna.

6. The label sensor of claim 1, wherein the activation circuit further comprises:
    two or more switches, wherein a first combination of activation of the two or more switches enables the first operational mode, and wherein a second combination of activation of the two or more switches enables a second operational mode of the plurality of operational modes.

7. The label sensor of claim 6, wherein a switch of the two or more switches has two operational states.

8. The label sensor of claim 6, wherein a switch of the two or more switches has more than two operational states.

9. The label sensor of claim 1 further comprises:
    a first portion of the label sensor being operable to move one or more distances with respect to a second portion of the label sensor, wherein the movement of the first portion with respect to the second portion of a first distance of the one or more distances is operable to enable the first operational mode.

10. The label sensor of claim 1, wherein the activation circuit further comprises:
    one or more removable layers operably coupled to the label sensor, wherein a first layer of the one or more removable layers, when removed, is operable to enable the operational mode.

11. The label sensor of claim 1, wherein the item comprises one or more of:
    a container;
    a box;
    a vial;
    a package;
    a personal item;
    a pet;
    an automobile component; and
    an article of manufacture.

12. The label sensor of claim 1, wherein the environmental sensor is operable to determine one or more quantities comprising one or more of:
    a moisture;
    a temperature;
    a pressure;
    a humidity;
    an altitude;
    a sonic wave;
    a human contact;
    a surface condition;
    a tracking; and
    a location.

13. The label sensor of claim 1, wherein the first section further comprises:
    a power source, wherein the power source includes one or more of:
        a power harvesting circuit operably coupled to the RF front end and the activation circuit; and
        a battery operably coupled to the activation circuit.

14. The label sensor of claim 1 further comprises:
    activating, by the activation circuit, the one or more of the memory, the environmental sensor, the RF front end and the processing module by providing enabling signals to the one or more of the memory, the environmental sensor, the RF front end and the processing module, wherein the enabling signals cause each of the one or more of the memory, the environmental sensor, the RF front end and the processing module to be placed in one of an active mode, a sleep mode and an inactive mode.

\* \* \* \* \*